United States Patent [19]

Willmouth

[11] 4,329,593
[45] May 11, 1982

[54] WIND ENERGY MACHINE UTILIZING CUP IMPELLERS

[76] Inventor: Robert W. Willmouth, 1011-Frederick-St. S., Arlington, Va. 22204

[21] Appl. No.: 185,729

[22] Filed: Sep. 10, 1980

[51] Int. Cl.³ ............................ F01D 5/14; F03D 9/00
[52] U.S. Cl. ...................................... 290/44; 290/55; 416/197 A
[58] Field of Search ................................... 290/42–44, 290/53–55; 416/30, 120, 123, 197 A, 197 C, 202, 243

[56] References Cited

U.S. PATENT DOCUMENTS

| | | |
|---|---|---|
| 21,892 | 3/1858 | Locke . |
| 266,524 | 8/1882 | Reiter . |
| 313,148 | 5/1885 | Winters . |
| 331,543 | 6/1885 | Read . |
| 366,204 | 6/1887 | Close . |
| 471,817 | 1/1892 | Green . |
| 529,197 | 5/1894 | Rollason . |
| 625,614 | 9/1899 | Thompson . |
| 1,077,431 | 6/1913 | Richardson . |
| 1,334,882 | 3/1920 | Boettner . |
| 1,415,645 | 5/1922 | Holterud ........................... 290/55 X |
| 1,526,631 | 8/1925 | Fagan . |
| 1,699,949 | 1/1929 | Bucklen ............................. 416/202 |
| 1,783,669 | 12/1930 | Oliver ............................... 290/44 X |
| 1,791,731 | 2/1931 | Madarasz . |
| 2,159,653 | 5/1939 | Carlin ................................. 416/123 |
| 2,517,135 | 1/1950 | Rudisill . |
| 2,603,300 | 9/1952 | King . |
| 3,020,963 | 11/1962 | Hakkarinen . |
| 3,051,072 | 7/1962 | Bohanon . |
| 3,545,729 | 12/1970 | Wisseroth et al. |
| 3,895,882 | 7/1975 | Moyer . |
| 3,930,750 | 6/1976 | Schultz . |
| 3,942,026 | 3/1976 | Carter . |
| 3,995,170 | 12/1976 | Graybill . |
| 4,047,833 | 10/1977 | Decker . |
| 4,109,465 | 3/1978 | Plen . |
| 4,130,380 | 5/1978 | Kaiser . |

Primary Examiner—J. V. Truhe
Assistant Examiner—Shelley Wade
Attorney, Agent, or Firm—Larry S. Nixon

[57] ABSTRACT

Cup-type impellers are utilized on wind energy machines which are driven according to a first embodiment to rotate about a vertical axis and according to a second embodiment to rotate about a horizontal axis. In the vertical axis embodiment, the shaft driven by the cups is coupled to one or more offset generators by a gear. Preferably, a single generator mounted to rotate about a vertical axis is utilized. The rotor of the generator is supported by a low friction vertical bearing. In a second embodiment, a pair of cone supports is utilized to drive a horizontally disposed shaft. The shaft is oriented normally with respect to wind direction by utilizing a wind vane mounted on a separate support which detects wind direction and transmits information regarding wind direction to a platform supporting the drive shaft. Preferably, the generator is mounted directly on the drive shaft.

10 Claims, 21 Drawing Figures

WIND ENERGY MACHINE UTILIZING CUP IMPELLERS

BACKGROUND OF THE INVENTION

1. Field of the Invention

This invention relates to wind-powered machines. More particularly, this invention relates to wind-powered machines which utilize cup impellers.

2. Prior Art and Other Considerations

Cup-type impellers have long been used for anemometers, which are usually very small meterological instruments utilized to measure wind velocity. Generally, anemometers utilize small generators which have an output that increases constantly with wind velocity. To applicant's knowledge, no serious attempts have been made to utilize cup impellers on large wind machines designed to generate electricity for other uses. One advantage to cup-type impellers is that they rotate at relatively low wind speeds. Accordingly, wind speeds less than ten miles per hour may be utilized to generate electrical current. In addition, cup-type impellers are relatively inexpensive to design and manufacture since they do not require the relatively sophisticated air foil shapes needed for efficient blade-type impellers.

Currently, there is considerable effort being expended to design efficient wind machines which rotate about a vertical axis so that the impellers do not need to be constantly reoriented to face the wind. Most of the arrangements now being considered utilize vertical blades which have complex compound curves and which are difficult to support because the vertical shaft driven by the blades must necessarily be relatively high. By utilizing a cup-type arrangement, the profile of the machine can be lowered considerably.

Cup impellers have not been used on wind machines which rotate a drive shaft about a horizontal axis because the shaft must be continually oriented to face the wind. Accordingly, the advantages of utilizing cup impellers for this type of machine have not been realized.

SUMMARY OF THE INVENTION

It is a feature of the instant invention to provide news and improved wind machines which utilize cup-type impellers.

In view of this feature, one embodiment of the instant invention contemplates a wind machine having a vertical drive shaft to which a plurality of cup-type impellers are mounted by an impeller supporting structure. The drive shaft is connected to an electrical generator by a gear. The electrical generator has its rotor offset from the drive shaft in a way such that only rotational energy is transmitted to the rotor.

In accordance with another embodiment, the instant invention contemplates cup-type impellers mounted to rotate a horizontal drive shaft. The horizontal drive shaft is geared to a generator mounted upon a platform which also supports the drive shaft and cup-type impellers. A wind direction vane is used to orient the drive shaft in a direction substantially normal to the wind direction.

The instant invention further contemplates a particular structure for the cup-type impellers wherein the impellers are mounted within the open end of cones. Preferably, the impellers, cones and supporting structure are all made from aluminum in order to conserve weight.

DESCRIPTION OF THE PREFERRED EMBODIMENTS

Figure 1:
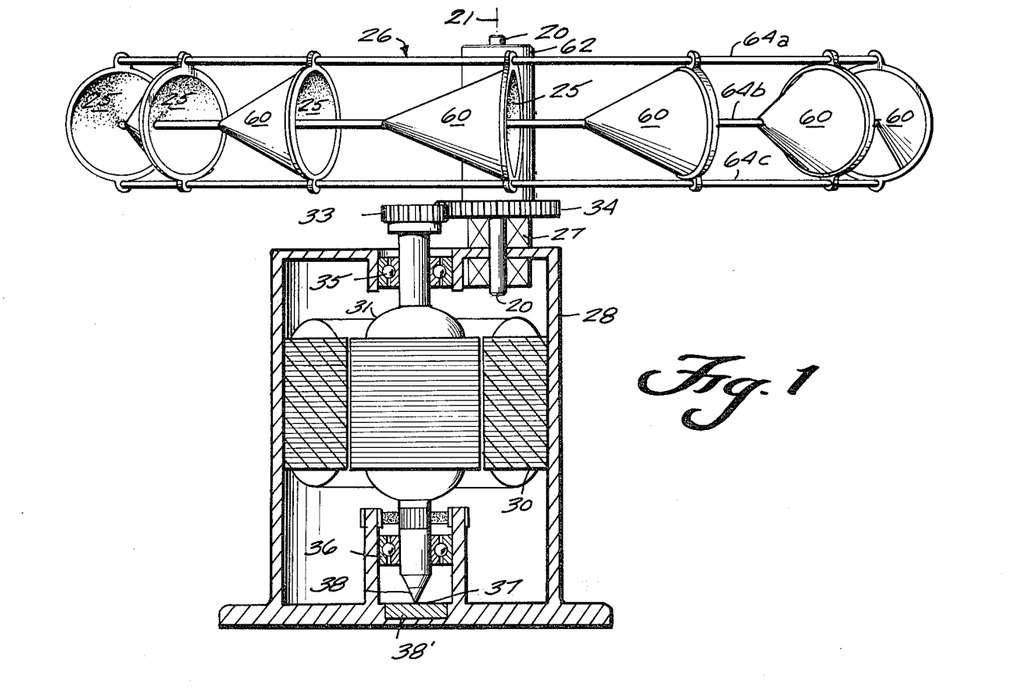
FIG. 1 is a side view of a wind energy machine according to one embodiment of the instant invention wherein cup-type impellers rotate about a vertical axis.

Referring now to FIGS. 1 through 5, there is shown a first embodiment of the instant invention wherein a wind-powered machine utilizes a drive shaft 20 which rotates about a vertical axis 21 under the influence of wind impinging on cup impellers 25 connected to the shaft 20 by a frame 26. In the illustration of FIG. 1, the shaft 20 is journalled in a bearing 27 on a supporting housing 28. Supporting housing 28 contains a generator 30 which has an armature or rotor 31 which also rotates about a vertical axis. The rotor 31 has a gear 33 keyed thereto which meshes with a gear 34 keyed to the shaft 20. The rotor 31 is supported radially by ball bearings 35 and 36 and vertically by an end bearing 37.

In the embodiment of FIG. 1, the bearing 37 comprises a hardened tungsten steel point 38 which may be rounded slightly and a hardened tungsten steel block 38' upon which the point rests. Accordingly, there is minimal friction between the rotor and its supporting structure. When the rotor 31 is spinning, it has a vertical inertial axis which tends to stabilize the rotor due to gyroscopic action. Moreover, the inertia of the rotor tends to store energy in a fluctuating wind condition so as to keep the cup impellers 25 rotating when the wind temporarily drops.

Figure 2:
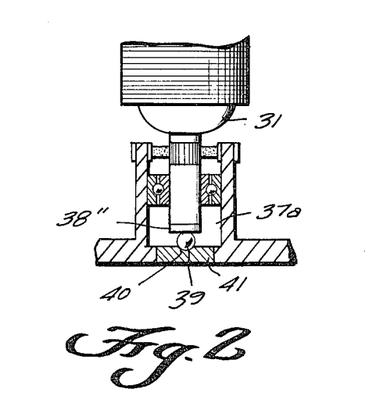
FIG. 2–4 illustrate various configurations for bearings used to support generators with rotors which rotate about vertical axes.
Figure 3:
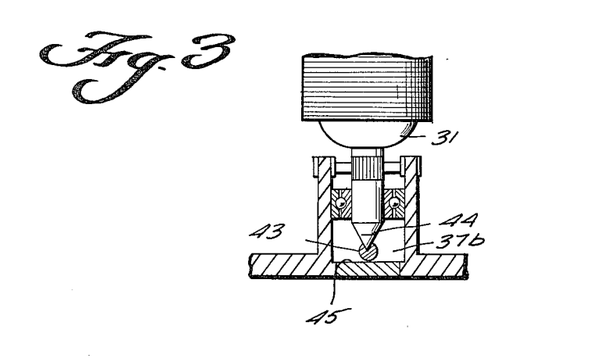
Figure 4:
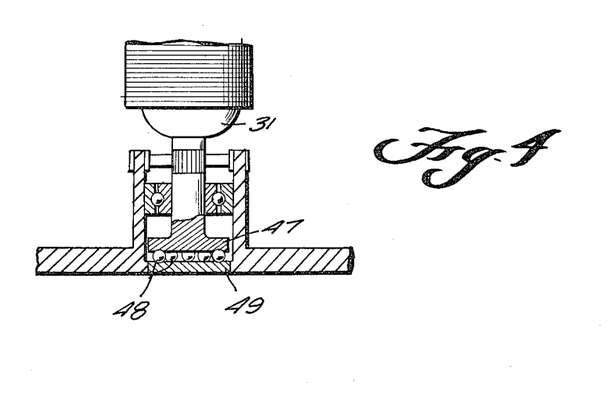
Figure 5:
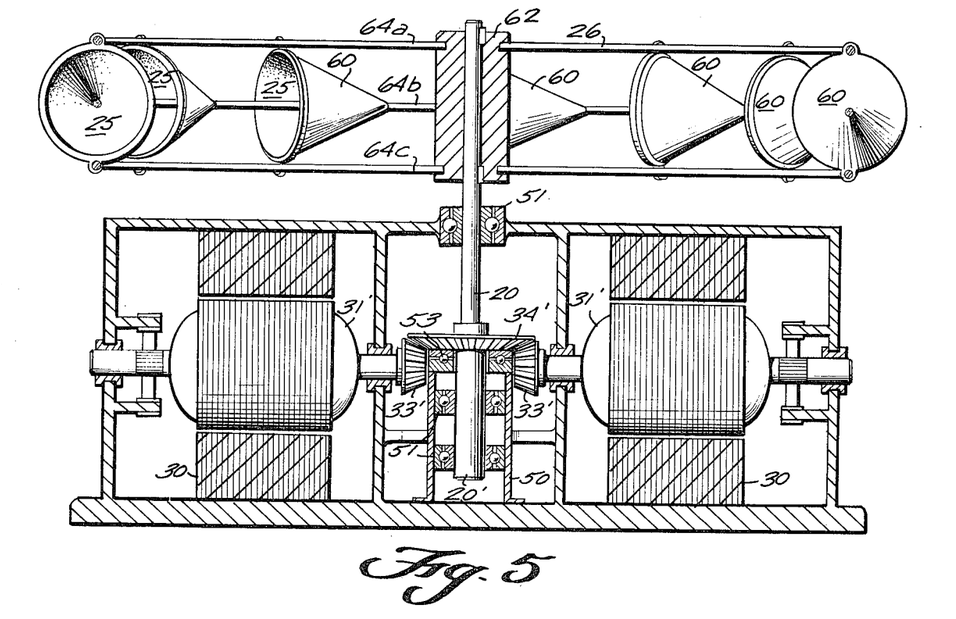
FIG. 5 illustrates an alternative arrangement for the first embodiment wherein a pair of generators with horizontally disposed rotors are utilized.

FIGS. 2, 3 and 4 show alternative embodiments of the bearing 37. In FIG. 2, the bearing 37a consists of a one-inch steel plate 38" on the bottom of the rotor 31 and a single steel ball bearing 39, approximately three inches in diameter, which is set in a depression 40 in a supporting plate 41. The depression 40 receives approximately one quarter of the surface area of the single ball 39. In FIG. 3, the bearing 37b includes a three-inch diameter spherical, steel bearing 43 keyed to a pointed projection 44 on the bottom of the armature shaft 31. The bearing 43 in turn rests on a hardened steel plate 45. In the embodiment of FIG. 4, the rotor 31 has a foot 47 thereon beneath which there is an assembly of three-quarter inch ball bearings 48 which rest on a bearing surface 49. Each of these arrangements minimizes frictional drag on the wind machine due to support of the generator rotor 31. In FIG. 5, a pair of generators 30 are utilized having horizontally disposed rotors 31'. With this arrangement, the profile of the wind machine can be reduced. Each rotor 31' has a gear 33' keyed thereto which meshes with bevel gear 34' keyed to the shaft 20. The bevel gear 34' has downwardly projecting teeth for meshing with the gears 33'. The vertical shaft 20 is supported in a housing 50 which has bearings 51 for stabilizing the vertical shaft and a thrust bearing 53 for supporting the vertical shaft. The shaft 20 is received in a bore in support shaft 20' and is removable therefrom should the assembly of cups 25 and frame 26 need to be disengaged from the generators in extremely high wind conditions.

Figure 6:
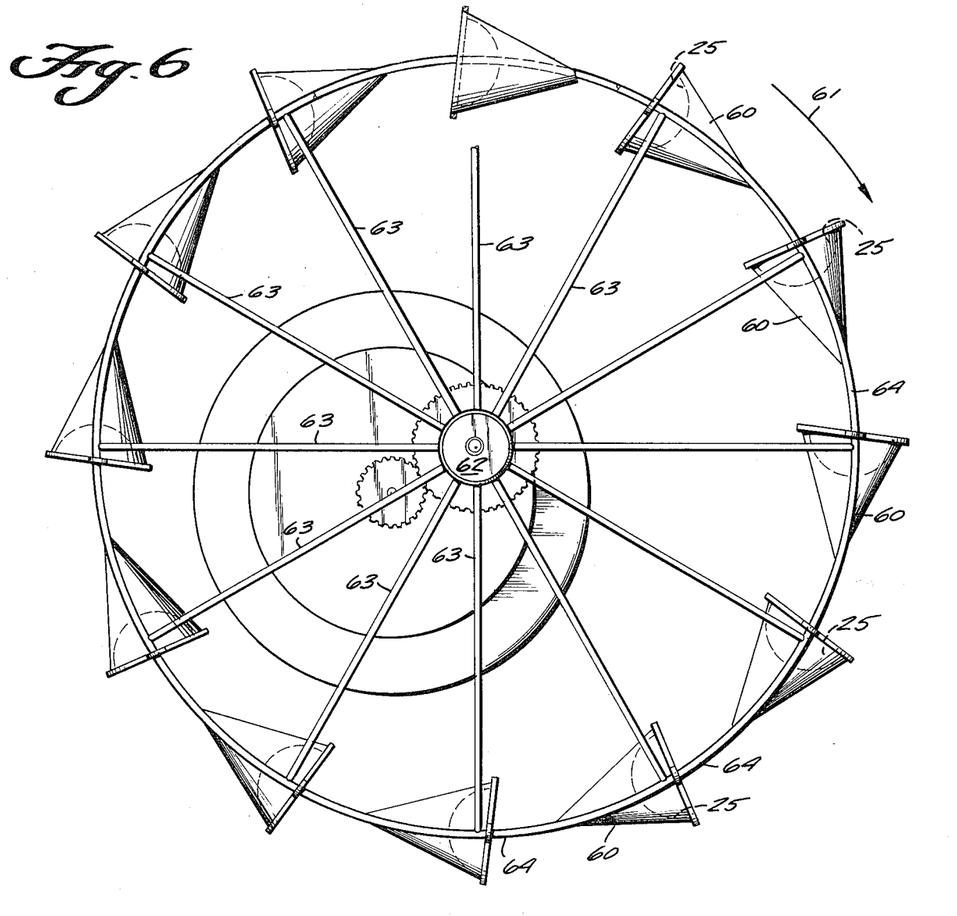
FIG. 6 is a top view of the wind energy machine of FIGS. 1–5.
Figure 7A:
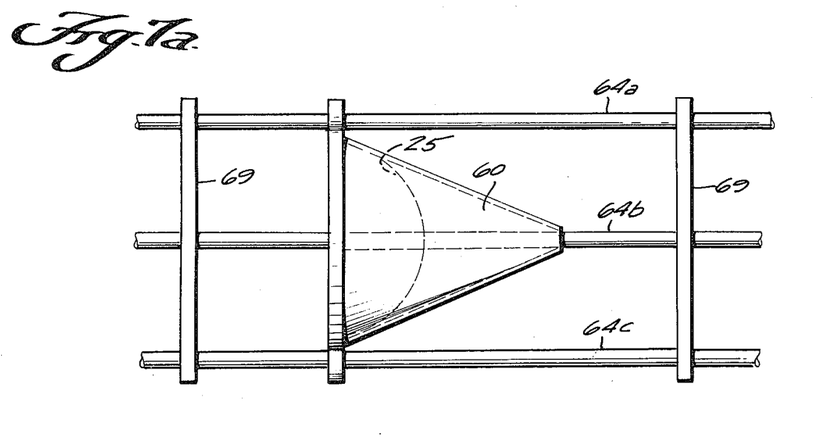
FIG. 7a is a side view showing how the cup-type impellers are supported on struts.
Figure 7B:
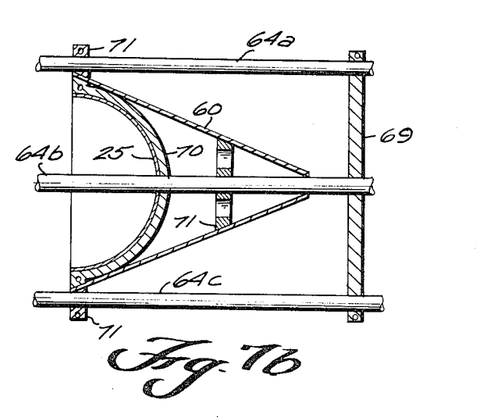
FIG. 7b is a sectional view of a cup-type impeller.

Referring now to FIG. 6 which is a top view of the frame 26 for mounting the cups 25, it is seen that each cup 25 is contained within a cone 60 so as to present a large frontal area for impingement of the wind and a tapered area, formed by the apex of the cone 60, which presents a small frontal area for movement through the wind. Accordingly, the frame 26 upon which the cups 25 and cones 60 are mounted rotates only in the direction of arrow 61. Should it be necessary for the shaft 20 to rotate in the opposite direction, then the cones and cups are simply all reversed. Preferably, cones are connected to a central hub 62 (keyed to the shaft 20) by radial steel supports 63. The cups 60 are joined to one another in the circumferential direction by aluminum tubing 64. In a preferred embodiment, the circle formed by the frame and cones is approximately 24 feet in diameter. Each cone 60 is approximately 4 feet long, and the cup 25 mounted therein has a diameter of about 3 feet. The steel supports 63 are made from steel tubing approximately 2½ inches thick. Preferably, each cone has two steel supports 63, of one of which extends from the bottom of the cones 60 to the bottom of the hub 62, while the other extends from the top of the cone to the top of the hub (See FIG. 1).

Figure 8A:
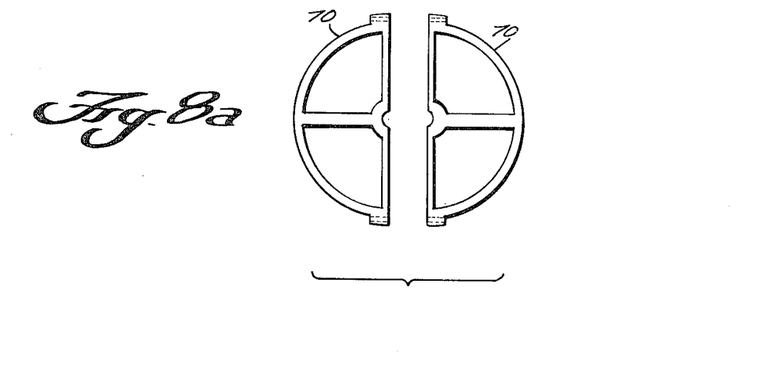
FIGS. 8a and 8b show aluminum castings which are used to support the cups and brace the struts.
Figure 8B:
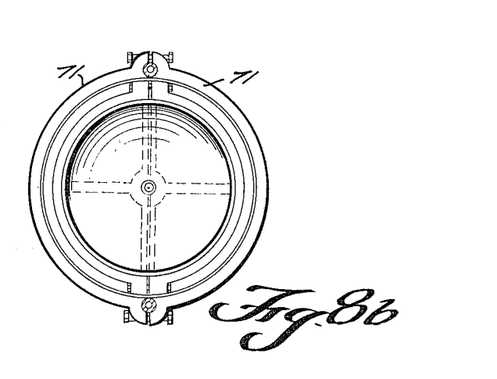

Referring now more particularly to FIGS. 7a, 7b, 8a and 8b, it is seen that the aluminum tubing 64 includes three bands of the tubes 64a, 64b and 64c. The tubing 64A extends around the top of the cones 60, the tubing 64c around the bottom and the tubing 64b through the center. Supports 69 extend between and interlock the tubes 64a, 64b and 64c at locations between the cones 60 in order to rigidify the system. As is seen in FIGS. 8a and 8b, the cups 25 are supported by aluminum castings 70 which are divided into two parts which are bolted together. The castings 70 form a concave support surface against which the cups 25 rest. The cones 60 fit over the castings 25 and are further supported by a split, cast discs 71.

In summary, the structure set forth in FIGS. 1 through 8 provides a wind generator which will produce electricity from wind having a speed of less than 10 miles per hour. To a large extent, this is accomplished by decreasing the friction and resistance between the armature rotor and the main bearings which support the rotor. By positioning the rotor 31 of the generator 30 vertically, one resistance point is eliminated between the bearings and the rotor. Preferably, the gear ratio between the gear 34 keyed to the shaft 20 and the gear 35 keyed to the rotor 31 is approximately 12 to 1 so that the rotor 31 spins at a relatively high rate of speed with respect to the rotation of the vertical shaft.

SECOND EMBODIMENT

Figure 9:
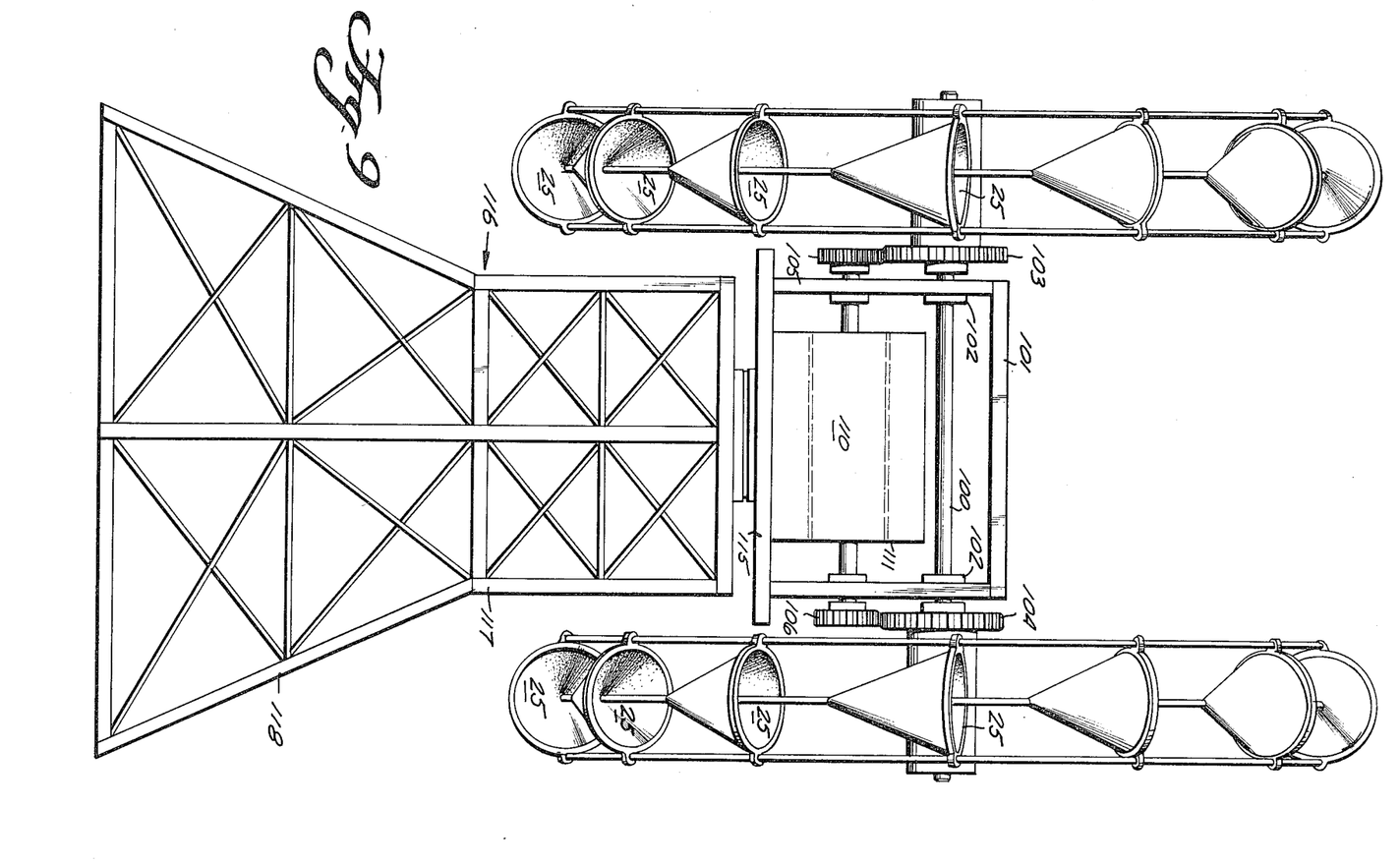
FIG. 9 is a front view of another embodiment of the instant invention showing a pair of cup-type impeller groups mounted to drive a horizontal drive shaft.
Figure 10:
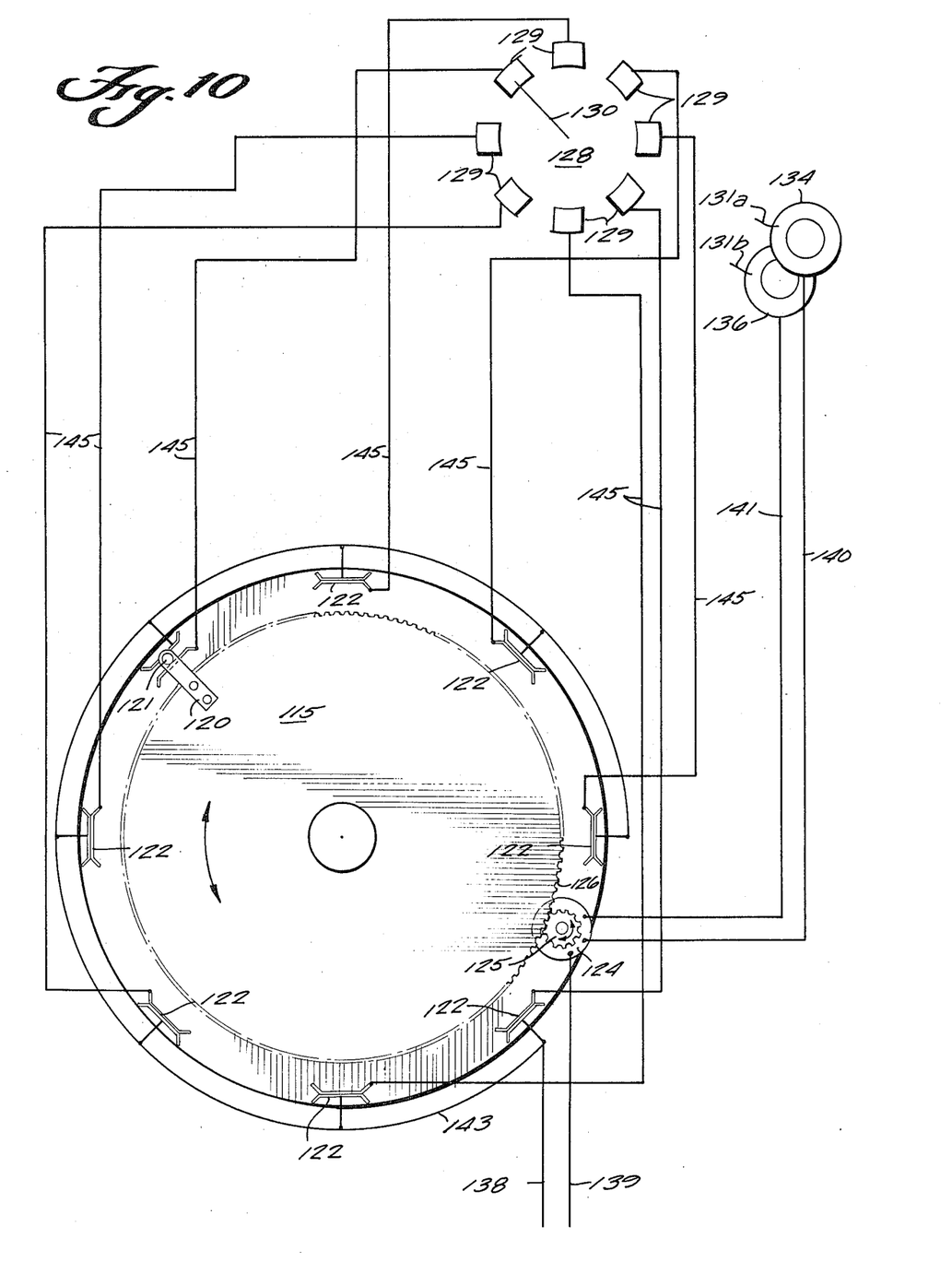
FIG. 10 is a schematic view of a positioning system for the impellers of FIG. 9.
Figures 11, 19:
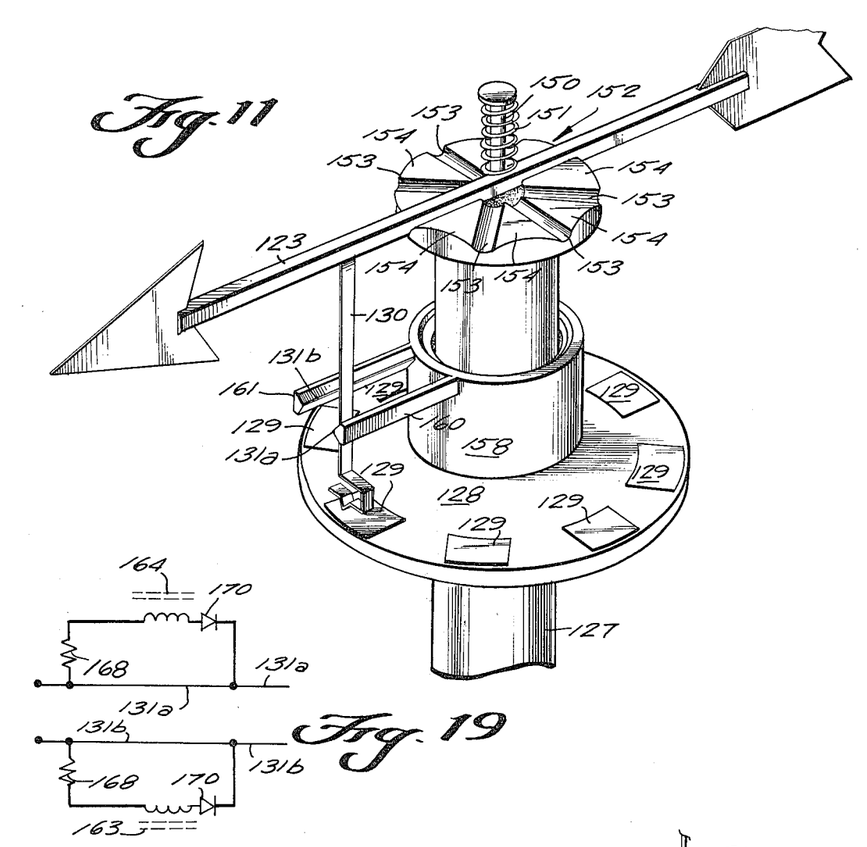
FIG. 11 is a perspective view of a wind direction determining device used with the positioning system of FIG. 9.
FIG. 19 is a diagram of a circuit for energizing an electromagnet used with the switch of FIGS. 17 and 18.

Referring now to FIGS. 9, 10, and 11, there is shown an embodiment of the instant invention wherein the cup-type impellers 25 are mounted on a horizontal shaft 100 which rotates about a horizontal axis. The same structure used to mount the cup impellers on the vertical axis as set forth in FIGS. 1 through 8 is used to mount them on the horizontal axis. The horizontal shaft 100 is journalled in a housing 101 by bearings 102 and includes a pair of driving gears 103 and 104 keyed to the shaft 100 for rotation therewith. The gears 103 and 104 are meshed with gears 105 and 106 that are in turn keyed to the rotor 10 of a generator 111. The generator 111 is also within the housing 101 and is mounted on a rotatable platform 115. The platform 115 is mounted rotatably on a tower 116 which includes a pedestal portion 117 and a wide base portion 118.

In order for the wind machine of FIG. 9 to function efficiently, the direction of the wind should be substantially normal to the drive shaft 100. This is accomplished by the orienting mechanism of FIG. 10 which senses the wind direction and orients the shaft 100 are right angles, or rather normal, thereto. The platform 115 includes a strut 120 which projects therefrom at 90° to the shaft 100 so that the direction in which the strut 120 faces is the direction from which the wind is blowing. The strut 120 also projects in the same direction that the concave portion of the cup impellers 25 face. The strut 120 has a rod 121 of insulating material projecting therefrom which opens a series of stationary switches 122 positioned around the periphery of the rototable platform 115. Upon opening the correct switch as determined by an arrow-type vane 123 (FIG. 11), the platform 115 will be correctly oriented.

Rotation of the platform 115 is accomplished by a reversible motor 124 which has a gear 125 that meshes with teeth 126 disposed above the periphery of platform 115. Preferably, the gear 125 meshes with a large diameter idler gear which in turn rotates a small diameter gear that is meshed with the teeth 126 on the platform 115. A preferred leverage ratio is 2×25×2. The main purpose of the leverage gear ratio is to relieve strain on the electric motor 124. The motor 124 is energized to rotate the gear 125 in either the clockwise or counterclockwise rotation when the vane 123 moves. The vane 123 is rotatably mounted on a separate tower or shaft 127 which has a stationary insulating plurality of contacts 129 (eight in number) disposed adjacent to the periphery thereof which corresponds in position to the stationary switches 122 adjacent the rotatable platform 115. The vane 123 has a contact 130 projecting therefrom which establishes an electrical connection with the contacts 129 so as to complete a circuit with one of the contacts 122.

Figure 12:
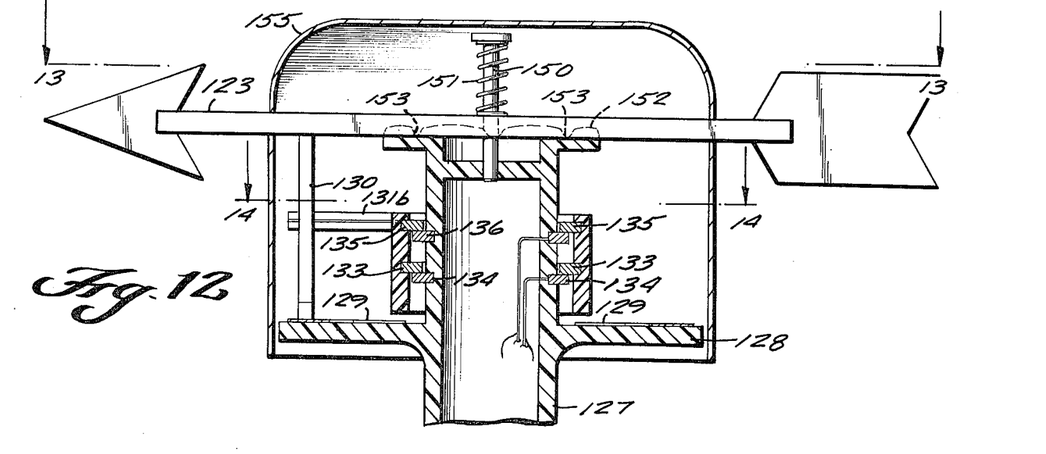
FIG. 12 is a vertical cross-section of the device of FIG. 11.

Mounted below the wind vane 123 are a pair of directional contacts 131a and 131b which extend on either side of the contact 130. The contacts 131a and 131b are also mounted so as to be rotatable about the stationary shaft 127. Upon rotation of the vane 123 so the contact 130 engages with one of the directional contacts 131a or 131b and a circuit is closed which causes the motor 124 to rotate in one direction if 131a is contacted or in the other direction if 131b is contacted. As is seen in FIG. 12, this is accomplished by a slip ring arrangement wherein contact 131a is connected to a ring 133 that is rotatable on the shaft 127a and abuts a take-off ring 134 which is stationary on the shaft 127. The contact 131b is connected to a ring 135 on the shaft 127 which contacts a stationary take-off ring 136 on the shaft. Accordingly, the directional contacts 131a and 131b can rotate as the vane 123 rotates. Connected to the ring 134 is a first line 40 which when connected causes the motor 124 to rotate clockwise and connected to the ring 136 is a second line 141 which when connected causes the motor to rotate counterclockwise.

As is seen in FIG. 10, in order to energize the motor 124, line current is brought in over lines 138 and 139. The current in line 138 is connected to one side of each switch 122 via line 143, while line 139 is connected directly to the motor 124. The outer side of each switch 122 is connected by a separate line 145 to the stationary contacts 129 on the stationary insulator 128. As long as the switches 122 are closed, current can flow therethrough, energizing the motor 124. However, as soon as one of the switches 122 is opened, current stops flowing and the motor 123 ceases rotation stopping rotation of the rotatable platform 115. As explained previously, in accordance with the disclosed embodiment, switches 122 are opened by the insulator 121 attached to the strut 120.

Figure 13:
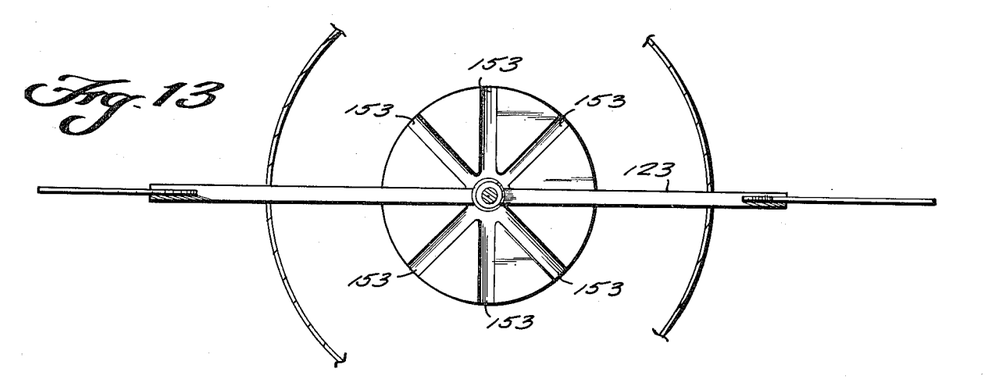
FIG. 13 is a horizontal cross-section taken along lines 13—13 of FIG. 12.

As is seen in FIGS. 11, 12 and 13, the vane 123 is mounted rotatably on a vertical shaft 150 which has a spring 151 thereon which spring urges the vane 123 into engagement with a six-inch diameter base plate 152. The base plate has a surface defined by alternate concave and convex areas forming eight grooves 153 and slopes 154. The grooves 153 are aligned with the contacts 129 on insulating base 128. A lightweight shroud 155 covers the assembly in order to protect the assembly from the elements and to keep the electrical contact areas clean. The vane 123 does not move until there is a relatively substantial change in wind direction. In other words, a change which supplies sufficient force to overcome the holding power of the spring 151. When the vane 123 starts to rotate, it will continue to rotate until it aligns itself with the wind. Upon overcoming the spring 151, the vane 123 wil engage one of the contacts 131a or 131b and thus energize the motor 124. However, the rotation of the vane 123 precedes the rotation of platform 115 due to the gearing between the reversible motor 124 and the platform 115 and also due to the inertia of the platform. Upon aligning itself with the wind, the vane 123 establishes an electrical connection between the contact 130 and one of the contacts 129. This completes a circuit to a particular switch 122 as long as that switch is closed. Connection of one of the directional contacts 131a or 131b to the switch 122 causes current to flow in over line 138, through that switch 122 and out over line 145 to the contact 129 and then through contact 130 and contact 131 before returning to the motor 124. As long as the switch 122 is closed, the motor 124 will be energized. However, when the insulator 121 separates the plates of the switch 122, the switch will open, cutting off power to the motor 124 and positioning the platform 115 so that the strut 120 faces into the wind. The strut 120 therefore positions the horizontal shaft 100 normal to the wind so that the cup-type impellers 25 will be efficiently rotated by the wind. When the vane 123 moves again to another contact 129, energy will again flow to the motor 124 until the appropriate contact 122 is opened.

Power is carried from the generator 111 down the tower 116 by a conventional slip ring arrangement which accommodates rotation of the platform 115 relative to the tower.

Figure 14:
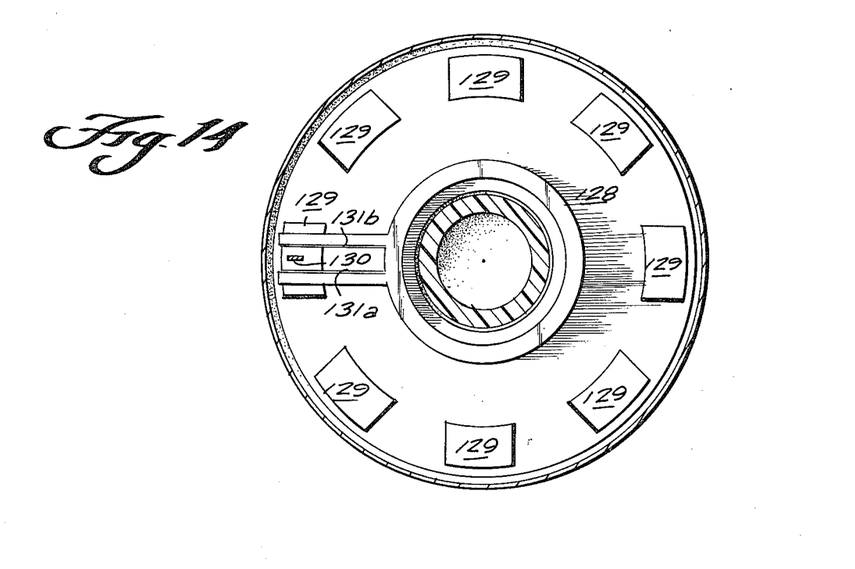
FIG. 14 is a horizontal cross-section taken along lines 14—14 of FIG. 12.
Figure 17:
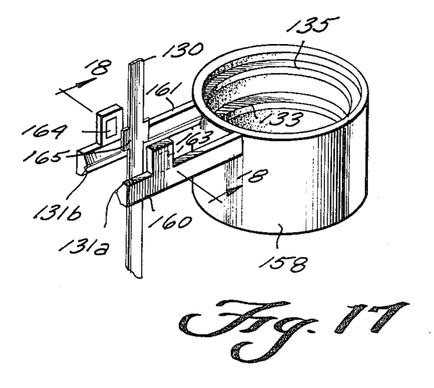
FIG. 17 is a perspective view of a motor drive switch used in conjunction with the direction determining device.
Figure 18:
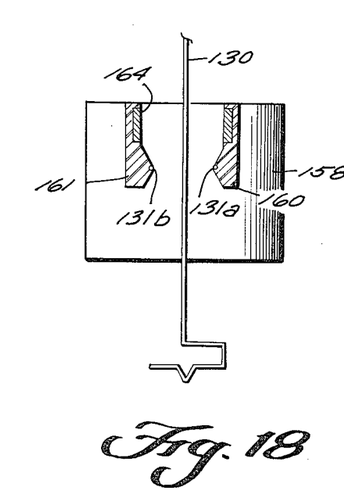
FIG. 18 is a side view, partially in section of the switch of FIG. 17.

Referring now to FIGS. 17 and 18 in conjunction with FIGS. 11, 12 and 14, a preferred approach to mounting the contact wires 131a and 131b is illustrated, wherein an insulating sleeve 158 having arms 160 and 161 for supporting the wires 131a and 131b is utilized. The sleeve 158 is rotatably mounted on the shaft 127 and includes the rings 133 and 135 embedded therein.

In order to ensure contact between the contact 130 and the wires 131a and 131when the wind force is sufficient to move the vane 123 from the groove 153, magnets 163 and 164 are mounted on arms 160 and 161 to attract an iron armature 165 on the contact 130. In order to prevent the iron armature 165 from actually engaging the magnets 163 and 164, the wires 131a and 131b are held projected beyond the magnets by triangular portions 166 and 167 of the arms 160 and 161.

A preferable approach is to make the magnets 163 and 164 electromagnetic as in shown in FIG. 19. This can be accomplished by connecting the magnets 163 and 164 to the wires 131a and 131b, respectively, via nine-volt resistors 168 and to 120-volt line current via silicon rectifiers 170. The 120-volt line current is supplied conveniently by the wires 131a and 131b which also serve as a ground for the silicon rectifier.

Figure 15:
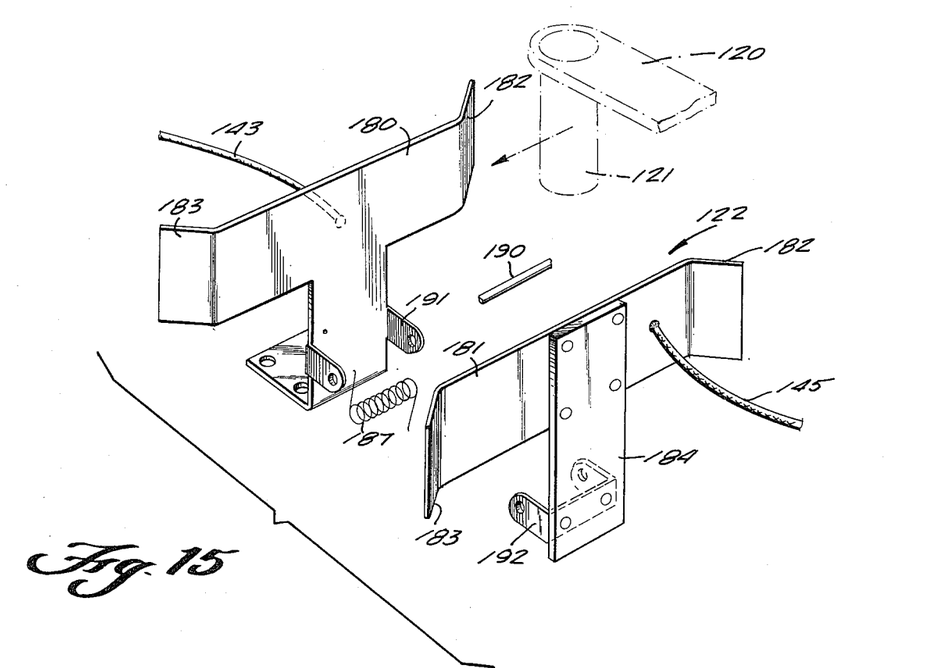
FIG. 15 illustrates the structure of a positioning switch used with a platform upon which the impellers and generator of FIG. 9 are mounted.

The particular structure of the switches 122 is shown in FIG. 15 wherein each switch includes a pair of contact plates 180 and 181 having flared ends 182 and 183. Normally, a spring 187 holds the plates 180 and 181 in engagement with one another so that current will flow therebetween. Plate 180 is preferably stamped from a single sheet of metal such as steel, while plate 181 is formed by securing a strip of sheet to a plastic insulator 184. Line 143 is secured to plate 180 while line 145 connects plate 181 to the contacts 129 on insulator plate 128. A pin 190 pivotally connects the plates 180 and 181 to one another at end hinges 191 and 192. It is readily seen that as insulator 121 is moved by the platform 115 between the flared ends 182 and 183 of the switches 122, the switches will open, disconnecting line 140 from line 145 and thereby stopping the motor 124.

Figure 16:
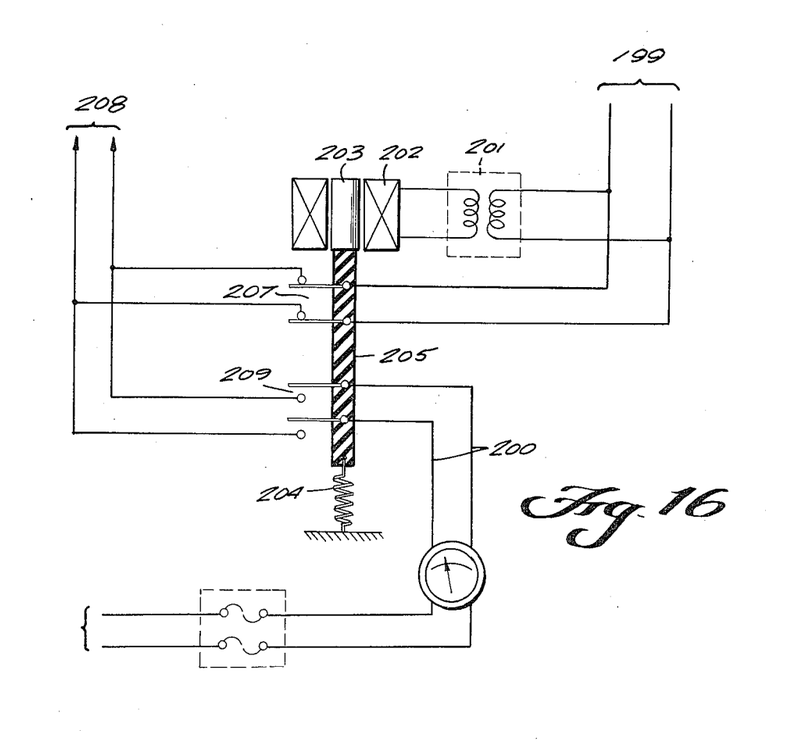
FIG. 16 is a circuit diagram showing integration of electrical power from the wind machine with commercial line current.

Referring now to FIG. 16, which shows a circuit diagram for integrating electrical power from the wind machine on lines 199 with commercial line current, line current coming in over lines 200 is automatically switches into the house or building current when there is no wind in order to provide the housing or building with a continuous cource of current. The circuit of FIG. 16 is used for both horizontal and vertical wind cones. When the generator driven by the wind is working, nine-volt current from a transformer 201 energizes a nine-volt electro-magnet 202 which attracts an iron bar 203 that is normally biased out of the electromagnet by a spring 204, which spring is connected to the bar by an insulator rod 205. As long as the bar 204 is attracted to the magnet 202, contacts 207 will be closed feeding current from wind machine lines 199 to the house or building lines 208. However, when current on lines 199 ceases, spring 204 moves the rod 205 down to open contacts 207 and close contacts 209 which delivers commercial line current from lines 200 to the house or building line 208.

What is claimed is:

1. An apparatus for generating electricity from wind currents, the apparatus comprising:
   a tower for supporting the apparatus;
   a rotational platform mounted on the tower for rotation about a vertical axis;
   a generator for generating electricity mounted on the platform for rotation therewith;
   a pair of impeller means mounted for rotation about a horizontal axis, which is fixed with respect to the platform, each impeller means including a frame extending in a vertical plane and a plurality of cups secured in spaced relation around the edge of the frame, each of said cups including a concave surface and a convex surface, said frame including a circular member, each of said cups being fastened to said circular member and having an axis which extends parallel to a targent of said circular member, the cup means all being oriented in the same direction;
   vane means mounted separate from said tower for aligning with wind direction;
   means for aligning the axis of the impeller means normal to the direction of the vane.

2. The apparatus of claim 1 wherein the vane means includes a vane with an electrical contact thereon and a stationary platform of insulating material, said platform having a plurality of spaced contacts thereon and leads from each contact to the aligning means, and wherein the aligning means includes a plurality of spaced switches oriented in the same directional position as the spaced contacts on the platform of the vane means with each switch means connected to a corresponding spaced contact; means on the rotational platform for opening the switches individually, and motor means for driving the rotational platform, the motor means being energized upon initial contact between the vane contact and a spaced contact and being deenergized upon opening of the switch associated with that spaced contact.

3. An apparatus for generating electricity from wind currents, the apparatus comprising:
   a vertical shaft for supporting an impeller which rotates in a horizontal orientation;
   the impeller including a horizontally extending frame and a plurality of cups secured in spaced relation at the periphery of the frame, said frame including a circular member, each of said cups being fastened to said circular member and having an axis which extends parallel of a tragent to said circular member, each cup being aligned with concave surfaces facing in one direction and convex surfaces in the opposite direction so that the impeller rotates in one direction regardless of the direction of the wind current; and
   an electrical generator operatively coupled to the shaft.

4. The apparatus of claims 1, 3 wherein each cup is contained within a cone tapering to a tip which tip provides the convex surface.

5. The apparatus of claim 4 wherein the horizontally extending frame includes steel spokes and aluminum rim members, to which rim members the cones are attached.

6. An apparatus for generating electricity from wind currents, the apparatus comprising:
   a tower for supporting the apparatus;
   a rotational platform mounted on the tower for rotation about a vertical axis;
   a generator for generating electricity mounted on the platform for rotation therewith;
   a pair of impeller means mounted for rotation about a horizontal axis, which is fixed with respect to the platform, each impeller means including a frame extending in a vertical plane and a plurality of cups secured in spaced relation around the edge of the frame, each of said cups including a conical outer surface and a convex inner surface different in shape from said conical outer surface, the cups all being oriented in the same relative direction;
   vane means mounted for independent alignment with wind direction;
   means for aligning the axis of the impeller means normal to the direction of the vane.

7. An apparatus for generating electricity from wind currents, the apparatus comprising:
   a vertical shaft for supporting an impeller which rotates in a horizontal orientation;
   the impeller including a horizontally extending frame and a plurality of cups secured in spaced relation at the periphery of the frame, each cup having a conical outer surface facing in one direction and a convex inner surface different in shape from said conical surface and aligned in the opposite direction so that the impeller rotates in one direction regardless of the direction of the wind current; and
   an electrical generator operatively coupled to said shaft.

8. An apparatus for generating electricity from wind currents, the apparatus comprising:
   a tower for supporting the apparatus;
   a rotational platform mounted on the tower for rotation about a vertical axis;
   a generator for generating electricity mounted on the platform for rotation therewith;
   a pair of impeller means mounted for rotation about a horizontal axis, which axis is fixed with respect to the platform, each impeller means including support means extending in a vertical plane and a plurality of cups secured in spaced relation around the edge of the supports means, each of said cups including a concave surface and a convex surface, the cups all being oriented in the same direction;
   a rotatably mounted vane with an electrical contact thereon;
   a stationary platform stationary with respect to said tower, said stationary platform having a plurality of spaced contacts thereon, said vane contact selectively resting on one of said spaced contacts corresponding to the position of said vane;
   a plurality of spaced switches mounted stationary with respect to said tower and each representing a discrete position of said rotational platform, each of said spaced contacts corresponding to one of said switches being electrically interconnected therewith;

means associated with the rotational platform for operating the nearest one of said switches; and motor means electrically connected with said switches and an assembly including said vane contact and spaced contacts, for driving the rotational platform, said opening means being positioned so that when said vane is perpendicular to said horizontal axis, said vane contact rests upon a spaced contact corresponding to the operated on of said switches.

9. Apparatus as in claim 8 further comprising first and second pivotal contacts pivotally mounted with said vane contact to enable current to pass between said vane contact and one of said first and second pivotal contacts when wind blows said vane in a first and second direction, respectively, said first and second pivotal contacts being electrically connected to said motor means to cause said motor means to rotate in first and second directions, respectively.

10. Apparatus as in claim 8 or 9 wherein;

each of said spaced switches comprises first and second contact members, each having a portion that flares away from the other and spring means for normally biasing said first and second contact members into contact; and said operating means includes an insulating member disposed to pass between said flared portions to separate said first and second contact members.

* * * * *